United States Patent
Matsuda

(10) Patent No.: US 9,482,170 B2
(45) Date of Patent: Nov. 1, 2016

(54) DECELERATION CONTROL SYSTEM IN A VEHICLE, VEHICLE INCLUDING A DECELERATION CONTROL SYSTEM, AND DECELERATION CONTROL METHOD

(75) Inventor: Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 173 days.

(21) Appl. No.: 13/187,354

(22) Filed: Jul. 20, 2011

(65) Prior Publication Data

US 2012/0022750 A1   Jan. 26, 2012

(30) Foreign Application Priority Data

Jul. 21, 2010   (JP) ................................ 2010-163663

(51) Int. Cl.

| | |
|---|---|
| *F02D 35/00* | (2006.01) |
| *F02D 41/04* | (2006.01) |
| *B60K 31/00* | (2006.01) |
| *F02D 41/02* | (2006.01) |
| *F02D 41/12* | (2006.01) |
| *B60W 10/06* | (2006.01) |
| *B60W 30/18* | (2012.01) |

(52) U.S. Cl.
CPC ............ *F02D 41/045* (2013.01); *B60K 31/00* (2013.01); *F02D 35/00* (2013.01); *F02D 41/0225* (2013.01); *F02D 41/12* (2013.01); *B60W 10/06* (2013.01); *B60W 30/18136* (2013.01); *B60W 2300/36* (2013.01); *B60W 2510/1005* (2013.01); *B60W 2540/10* (2013.01); *B60W 2540/12* (2013.01); *B60W 2710/0677* (2013.01); *F02D 2200/101* (2013.01); *F02D 2200/50* (2013.01); *F02D 2200/602* (2013.01)

(58) Field of Classification Search
CPC ................ G06F 17/00; B60W 10/06; B60W 30/18136; B60W 2300/36; F02D 41/045; F02D 41/0225; F02D 41/12; F02D 35/00; B60K 31/00
USPC ..................................................... 701/51, 70
See application file for complete search history.

(56) References Cited

U.S. PATENT DOCUMENTS 4,936,405 A * 6/1990 Hrovat ........................... 180/197
5,517,414 A * 5/1996 Hrovat ............................ 701/91

(Continued)

FOREIGN PATENT DOCUMENTS

| JP | 6-43235 | 6/1994 |
| JP | 10009007 A | 1/1998 |

(Continued)

*Primary Examiner* — Behrang Badii
*Assistant Examiner* — Daniel L Greene
(74) *Attorney, Agent, or Firm* — Alleman Hall McCoy Russell & Tuttle LLP

(57) ABSTRACT

A deceleration control system in a vehicle comprises; a deceleration start detector; a memory for storing a normal state rule and a deceleration state rule to control a driving power, and a controller for controlling the driving power; wherein in the deceleration state rule, the driving power is changed based on the detection by a driving state detector, and a driving power decided in accordance with the deceleration state rule is greater than a driving power decided in accordance with the normal state rule according to the same driving state: and wherein the controller switches the normal state rule to the deceleration state rule and controls the driving power in accordance with the deceleration state rule, based on the detection by the driving state detector, when the deceleration start detector detects that the deceleration has started.

15 Claims, 9 Drawing Sheets

(56) References Cited

U.S. PATENT DOCUMENTS

| | | | |
|---|---|---|---|
| 6,549,840 B1* | 4/2003 | Mikami et al. | 701/69 |
| 6,650,987 B2* | 11/2003 | Kogure et al. | 701/80 |
| 7,124,027 B1* | 10/2006 | Ernst et al. | 701/301 |
| 8,061,464 B2* | 11/2011 | Boesch | 180/197 |
| 2002/0087251 A1* | 7/2002 | Kogure et al. | 701/80 |
| 2004/0015279 A1* | 1/2004 | Barron et al. | 701/37 |
| 2005/0044944 A1* | 3/2005 | Kogure et al. | 73/146 |
| 2006/0241843 A1* | 10/2006 | Matsuda | B60K 28/16 701/85 |
| 2008/0183353 A1* | 7/2008 | Post et al. | 701/42 |
| 2008/0319626 A1* | 12/2008 | Ogawa | 701/80 |
| 2009/0210128 A1* | 8/2009 | Fujimoto et al. | 701/84 |
| 2009/0228183 A1* | 9/2009 | Watabe et al. | 701/90 |
| 2009/0326777 A1* | 12/2009 | Oshima et al. | 701/83 |
| 2012/0022761 A1* | 1/2012 | Matsuda | 701/87 |

FOREIGN PATENT DOCUMENTS

| | | |
|---|---|---|
| JP | 2005098281 A | 4/2005 |
| JP | 2005315180 A | 11/2005 |
| JP | 2006-46300 A | 2/2006 |
| JP | 2006312928 A | 11/2006 |
| JP | 2009-8056 A | 1/2009 |

* cited by examiner

DECELERATION CONTROL SYSTEM IN A VEHICLE, VEHICLE INCLUDING A DECELERATION CONTROL SYSTEM, AND DECELERATION CONTROL METHOD

CROSS-REFERENCE TO RELATED APPLICATION

The present application claims priority to and the benefit of Japanese Patent Application No. 2010-163663 filed on Jul. 21, 2010, which is hereby incorporated by reference in its entirety for all purposes.

BACKGROUND OF THE INVENTION

1. Field of the Invention

The present invention relates to a deceleration control system in a vehicle such as a motorcycle, a vehicle including the deceleration control system, and a deceleration control method of the vehicle.

2. Description of the Related Art

Japanese Utility Model Application Publication No. Hei. 6-43235 discloses a conventional deceleration system in a vehicle. This deceleration system determines whether or not deceleration (engine braking) resulting from a back torque transmitted from a drive wheel toward a driving power source is rapid, based on a vehicle speed and a shifted gear position, when a throttle valve in an engine is fully closed. If the deceleration is rapid, an air control valve provided auxiliarily with the throttle valve is opened, so that air is supplied to the engine.

In the conventional deceleration system, the air control valve operates in a uniformly fixed manner after it is determined that the deceleration is rapid, and the degree to which deceleration is mitigated is constant. The magnitude of an engine braking force changes according to a driving state of a vehicle. Therefore, the degree to which deceleration is mitigated is insufficient or in excess if the air control valve operates in a fixed manner.

SUMMARY OF THE INVENTION

The present invention addresses the above described condition, and an object of the present invention is to properly mitigate the degree of deceleration caused by a back torque.

According to an aspect of the present invention, a deceleration control system in a vehicle comprises a driving state detector for detecting a driving state of the vehicle; a deceleration start detector for detecting whether or not deceleration of the vehicle has started; a memory for storing a control rule to control a driving power of a driving power source in the vehicle, the control rule including a normal state rule and a deceleration state rule being different from each other; and a controller for controlling the driving power of the driving power source in accordance with the control rule; wherein the deceleration state rule is set so that the driving power of the driving power source is changed based on a result of the detection performed by the driving state detector, and a driving power of the driving power source which is decided in accordance with the deceleration state rule according to a particular driving state is greater than a driving power of the driving power source which is decided in accordance with the normal state rule according to the particular driving state: and wherein the controller switches the control rule from the normal state rule to the deceleration state rule and controls the driving power of the driving power source in accordance with the deceleration state rule, based on a result of the detection performed by the driving state detector, when the deceleration start detector detects that the deceleration of the vehicle has started.

In accordance with this configuration, when the deceleration start detector detects deceleration caused by the back torque, the controller controls the driving power of the driving power source in accordance with the deceleration state rule. Since the driving power controlled in accordance with the deceleration state rule is greater than a driving power decided in accordance with the normal state rule, the degree of the deceleration is mitigated. In addition, since the driving power changes according to the driving state of the vehicle, the degree to which the deceleration is mitigated changes according to the driving state of the vehicle. Therefore, it is possible to suitably suppress the deceleration from being mitigated insufficiently or in excess.

The deceleration start detector may determine whether or not a deceleration start condition that a driver has performed an operation for starting the deceleration is met and may detect that the deceleration of the vehicle has started when the deceleration start condition is met. In accordance with this configuration, the deceleration of the vehicle can be controlled in response to the driver's operation for starting the deceleration.

The deceleration start detector may determine that the deceleration start condition is met when the driver terminates an operation of an acceleration operation member. In accordance with this configuration, the deceleration of the vehicle can be controlled in response to the driver's termination operation of the acceleration operation member.

The deceleration start detector may determine that the deceleration start condition is met when a reduction gear ratio in a transmission is changed to a greater value. In accordance with this configuration, the deceleration of the vehicle can be controlled, in response to the driver's operation of the deceleration operation member or the driver's actuation of a braking device.

The deceleration start detector may determine that the deceleration start condition is met when an amount of an operation of a deceleration operation member performed by the driver is greater than a predetermined amount or a brake pressure is higher than a predetermined pressure value. In accordance with this configuration, the deceleration of the vehicle can be controlled according to the driver's operation to decelerate the vehicle.

The controller may maintain a state where the driving power of the driving power source is controlled in accordance with the deceleration state rule for a predetermined period of time that elapses after the control rule has been switched to the deceleration state rule. In accordance with this configuration, it is possible to prevent a situation in which the control rule is switched to the normal state rule immediately after it has been switched to the deceleration state rule. As a result, it is possible to properly mitigate the degree of the deceleration.

The deceleration start detector may include two or more of a first estimator for estimating that the deceleration has started when a braking device is actuated by a braking operation performed by the driver, a second estimator for estimating that the deceleration has started when a reduction gear ratio in the transmission is changed to be higher, a third estimator for estimating that the deceleration has started when an acceleration operation is not performed by the driver, and a fourth estimator for estimating that the deceleration has started when a detected value of a rotational speed of the driving power source is a predetermined amount greater than an estimated value of the rotational speed which is estimated from the driving power of the driving power source; and the deceleration start detector may determine that the deceleration start condition is met when either one of the two or more estimators estimates that the deceleration has started. In accordance with this configuration, the control is initiated in accordance with the deceleration state rule when any one of plural situations occurs, from which it is estimated that the deceleration has started. Thus, it is possible to properly mitigate the degree of deceleration depending on various situations.

The driving state detector may include a reduction gear ratio detector for detecting a reduction gear ratio in a transmission and a rotational speed detector for detecting a rotational speed of the driving power source; and the controller may control the driving power of the driving power source in accordance with the deceleration state rule, based on the reduction gear ratio detected by the reduction gear ratio detector and the rotational speed detected by the rotational speed detector. In accordance with this configuration, the degree to which the deceleration is mitigated can be adjusted suitably according to the transmission gear position and the rotational speed of the driving power source.

The controller may control the driving power of the driving power source in accordance with the deceleration state rule such that an increasing magnitude of a driving power of the driving power source corresponding to a first reduction gear ratio in a transmission is greater than an increasing magnitude of a driving power of the driving power source corresponding to a second reduction gear ratio in the transmission, the second reduction gear ratio being less than the first reduction gear ratio. In accordance with this configuration, when the reduction gear ratio in the transmission is greater, i.e., the degree of deceleration tends to be greater, the increasing magnitude of the driving power of the driving power source is made greater. Thus, the degree to which the deceleration is mitigated can be adjusted according to the transmission gear position.

The controller may control the driving power of the driving power source in accordance with the deceleration state rule such that an increasing magnitude of a driving power of the driving power source corresponding to a first rotational speed of the driving power source is greater than an increasing magnitude of a driving power of the driving power source corresponding to a second rotational speed of the driving power source, the second rotational speed being less than the first rotational speed. If the magnitude of a back torque is great after the deceleration has started, the rotational speed of the driving power source tends to increase, and the degree of the deceleration tends to be great. In accordance with the above configuration, in this case, the increasing magnitude of the driving power of the driving power source is made greater. In this way, the degree to which the deceleration is mitigated can be adjusted according to the rotational speed of the driving power source.

The deceleration control system in the vehicle may further comprise a slip value detector for detecting a slip value of a drive wheel; and the controller may compensate the driving power of the driving power source decided in accordance with the deceleration state rule, based on the slip value of the drive wheel detected by the slip value detector. In accordance with this configuration, the driving power transmitted to the drive wheel can be controlled based on the slip value of the drive wheel. This makes it possible to suppress undesired drive wheel slip.

The controller may change the driving power of the driving power source such that the driving power gets closer over time to a driving power decided in accordance with the normal state rule, when a condition used for switching the control rule to be referred to from the deceleration state rule to the normal state rule is met. In accordance with this configuration, a deviation between the driving power of the driving power source at a time point when the condition used for switching to the normal state rule is met and the driving power decided in accordance with the normal state rule, can be lessened gradually. Thus, a comfortable driving feeling can be kept.

The controller may inhibit switching from the normal state rule to the deceleration state rule when a driving speed is less than a predetermined value.

In accordance with this configuration, it is possible to prevent an event that the control rule is switched from the normal state rule to the deceleration state rule during a stopped state of the vehicle.

The deceleration start detector may detect whether or not deceleration caused by a back torque applied from a drive wheel to the driving power source has started. In accordance with this configuration, it is possible to control the deceleration of the vehicle according to a timing when the deceleration caused by the back torque is about to start.

The deceleration start detector may detect whether or not deceleration caused by a back torque has started, based on an amount of an operation of an operation member performed by the driver. In accordance with this configuration, it is possible to properly detect that the deceleration caused by the back torque has started, according to the driver's operation for starting deceleration.

The normal state rule may be a control rule in a case where a back torque applied from a drive wheel toward the driving power source does not occur; and the deceleration state rule may be a control rule in a case where the back torque occurs.

According to another aspect of the present invention, a vehicle comprises a deceleration control system including: a driving state detector for detecting a driving state of the vehicle; a deceleration start detector for detecting whether or not deceleration of the vehicle has started; a memory for storing a control rule to control a driving power of a driving power source in the vehicle, the control rule including a normal state rule and a deceleration state rule being different from each other; and a controller for controlling the driving power of the driving power source in accordance with the control rule; wherein the deceleration state rule is set so that the driving power of the driving power source is changed based on a result of the detection performed by the driving state detector, and a driving power of the driving power source which is decided in accordance with the deceleration state rule according to a particular driving state is greater than a driving power of the driving power source which is decided in accordance with the normal state rule according to the particular driving state: and wherein the controller switches the control rule from the normal state rule to the deceleration state rule and controls the driving power of the driving power source in accordance with the deceleration state rule, based on a result of the detection performed by the driving state detector, when the deceleration start detector detects that the deceleration of the vehicle has started. In accordance with this vehicle, the degree of the deceleration is mitigated in a situation where the deceleration caused by the back torque occurs, and the degree to which the deceleration is mitigated, can be changed, according to the driving state of the vehicle.

According to a further aspect of the present invention, a deceleration control method for a vehicle, comprises the steps of: detecting whether or not deceleration caused by a back torque has started; and controlling a driving power of a driving power source to mitigate a degree of the deceleration by changing the driving power based on a driving state of the vehicle, when it is detected that the deceleration caused by the back torque has started, in the detecting step. In accordance with this method, the driving power of the driving power source can be controlled in such a manner that the degree of the deceleration is mitigated by changing the driving power according to the driving state after the deceleration caused by the back torque is detected. Therefore, the degree to which the deceleration is mitigated can be changed according to the driving state of the vehicle. As a result, it is possible to suitably suppress the degree of the deceleration from being mitigated insufficiently or in excess.

The deceleration control method may comprise the step of: calculating a value corresponding to a speed change per unit time after the deceleration caused by the back torque has started, based on a driving state of the vehicle; and in the step of controlling the driving power of the driving power source, the driving power may be compensated such that an increasing magnitude of the driving power is greater as the value corresponding to the speed change per unit time is greater. This makes it possible to increase the degree to which the deceleration is mitigated when the degree of the deceleration is greater.

According to a further aspect of the present invention, a deceleration control method for a vehicle comprises the steps of: estimating whether or not deceleration caused by a back torque has started, based on an amount of an operation of an operation member performed by a driver; and controlling a driving power of a driving power source to mitigate a degree of the deceleration, when it is estimated that the deceleration caused by the back torque has started, in the estimating step. In accordance with this method, an engine braking force can be attenuated according to the driver's operation.

The above and further objects, features and advantages of the invention will more fully be apparent from the following detailed description with reference to the accompanying drawings.

DETAILED DESCRIPTION OF THE PREFERRED EMBODIMENTS

Hereinafter, an example in which a deceleration control system in a vehicle according to an embodiment of the present invention is built into a motorcycle will be described with reference to the drawings. The stated directions are referenced from the perspective of a driver straddling a motorcycle, unless otherwise explicitly noted.

Figure 1:
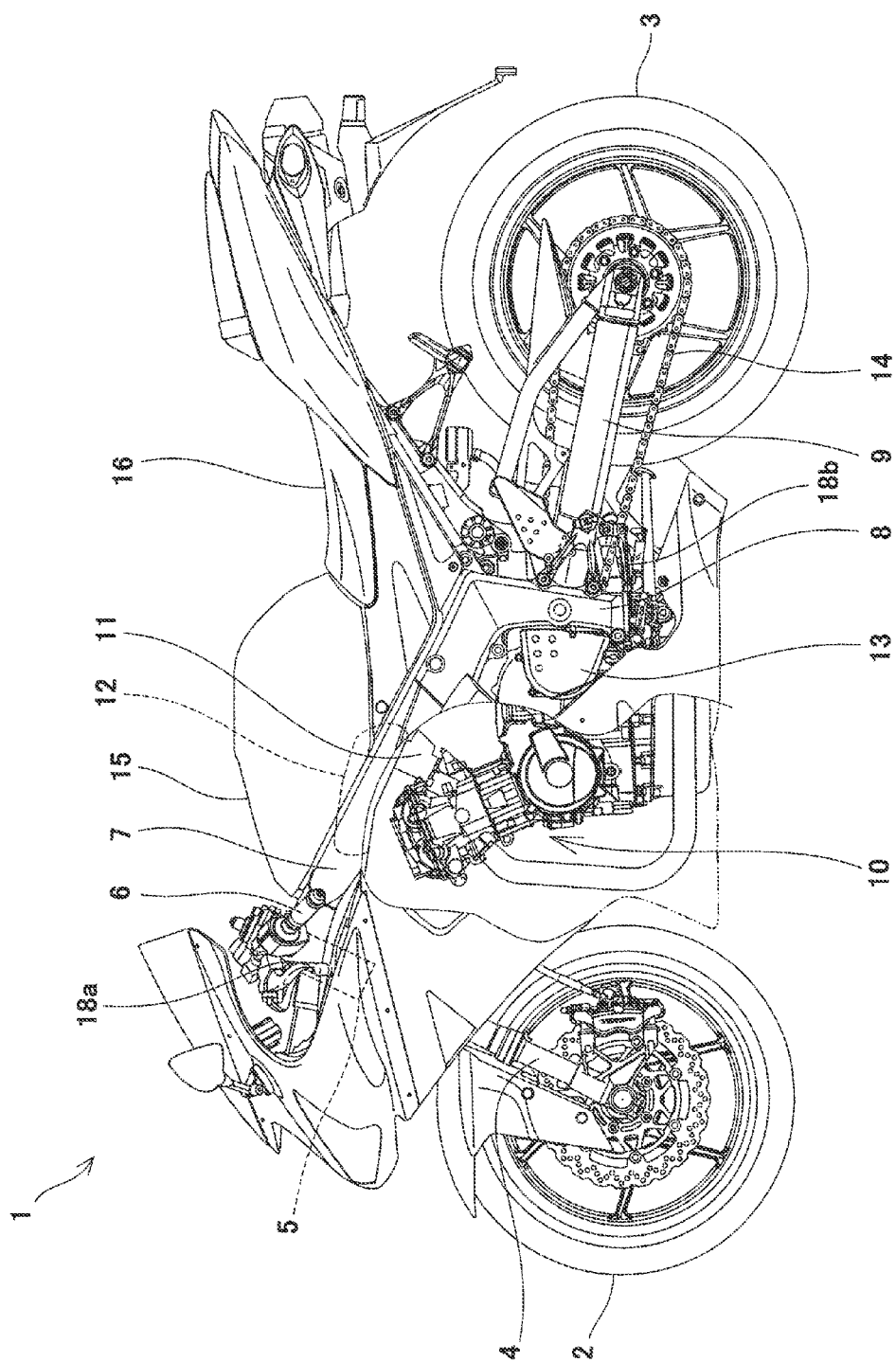
FIG. 1 is a left side view of a motorcycle described as an exemplary vehicle incorporating a deceleration control system according to an embodiment of the present invention.

FIG. 1 is a left side view of a motorcycle 1 which is an exemplary vehicle incorporating a deceleration control system according to an embodiment of the present invention. Referring now to FIG. 1, the motorcycle 1 includes a front wheel 2 which is a driven wheel and a rear wheel 3 which is a drive wheel. The front wheel 2 is rotatably mounted to the lower end portion of a front fork 4 extending substantially vertically. The upper end portion of the front fork 4 is coupled to a handle 6 including a pair of right and left grips via a steering shaft (not shown) rotatably supported by a head pipe 5. A pair of right and left main frame members 7 extend rearward to be slightly tilted in a downward direction from the head pipe 5. A pair of right and left pivot frame members 8 are coupled to the rear portions of the main frame members 7, respectively. The front end portions of swing arms 9 extending substantially in the longitudinal direction of the motorcycle 1 are coupled to the pivot frame members 8, respectively such that each swing arm 9 is pivotable around the front end portion.

An inline four-cylinder engine 10 which is a driving power source for driving the motorcycle 1 is mounted to the main frame members 7 and the pivot frame members 8. Intake ports (not shown) of the engine 10 are coupled to the throttle device 11 which is coupled to an air cleaner 12. A driving power generated in the engine 10 is transmitted to the rear wheel 3 via a transmission 13 and a chain 14.

A fuel tank 15 is provided behind the handle 6. A straddle-type seat 16 is provided behind the fuel tank 15. An engine electronic control unit 40 (hereinafter referred to as engine ECU) is accommodated in a space below the seat 16. The driver straddling the seat 16 rotates the steering handle 6 while gripping the right and left grips to turn the front wheel 2 around the steering shaft. A right grip of the handle 6 is a throttle grip 17 (see FIG. 2) which is an acceleration operation member operated by the driver. By rotating the throttle grip 17, the driver can input an acceleration request command. A clutch lever 18a is provided in front of a left grip and a shift pedal 18b is provided at a left pedal. A brake lever 19a (see FIG. 2) is provided in front of the right grip of the handle 6. A right pedal is a brake pedal 19b (see FIG. 2). The driver operates the brake lever 19a and depresses the brake pedal 19b to input a deceleration request command or a braking request command.

Figure 2:
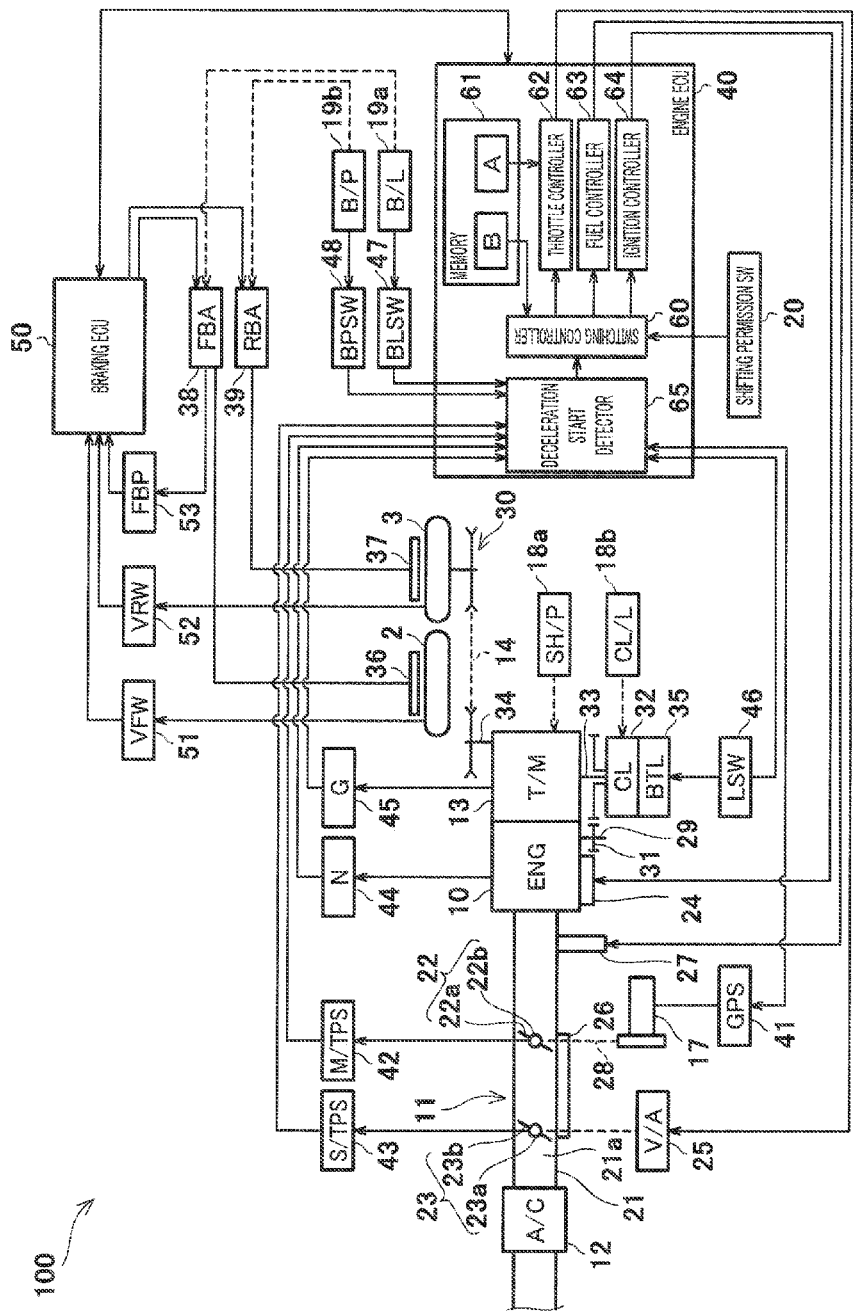
FIG. 2 is a view showing an overall construction of the deceleration control system incorporated into the motorcycle of FIG. 1.

FIG. 2 is a view showing an overall construction of the deceleration control system 100 incorporated into the motorcycle of FIG. 1. Firstly, a power unit of the motorcycle 1 will be described with reference to FIG. 2. Referring to FIG. 2, the throttle device 11 includes an air-intake pipe 21, a main throttle valve 22, and a sub-throttle valve 23. The air-intake pipe 21 has an air-intake passage 21a through which air is supplied from the air cleaner 12 to the engine 10. The main throttle valve 22 and the sub-throttle valve 23 are provided within the air-intake passage 21a. The sub-throttle valve 23 is positioned upstream of the main throttle valve 22 in an air flow direction.

The main throttle valve 22 is a butterfly valve including a disc-shaped valve body 22b and a valve shaft 22a attached to the valve body 22b. The disc-shaped valve body 22b is rotated to change an opening degree of the main throttle valve 22. The sub-throttle valve 23 is a butterfly valve including a disc-shaped valve body 23b and a valve shaft 23a attached to the valve body 23b. The disc-shaped valve body 23b is rotated to change an opening degree of the sub-throttle valve 23. The valve shaft 22a is coupled to the throttle grip 17 via a cable 24. When the driver operates the throttle grip 17, the valve shaft 22a is rotated and the opening degree of the main throttle valve 22 is changed. When the driver terminates the operation of the throttle grip 17 and its operated position (hereinafter referred to as "grip position") is a fully closed position, the main throttle valve 22 is in a fully closed position. The valve shaft 23a is coupled to a valve actuator 25 such as a stepping motor or the like. When the valve actuator 25 is actuated, the valve shaft 23a rotates and the opening degree of the sub-throttle valve 23 is changed.

The throttle device 11 may include a rotation transmission mechanism 26 for transmitting the rotation of the valve shaft 23a to the valve shaft 22a. This allows the opening degree of the main throttle valve 22 to be greater than an opening degree corresponding to the fully closed position even when the grip position is in the fully closed position. That is, in a state where the grip position is in the fully closed position and the opening degree of the sub-throttle valve 23 is an opening degree corresponding to the fully closed position, the valve actuator 25 may be actuated to rotate the valve shaft 23a such that the opening degree of the sub-throttle valve 23 is increased. Because of the operation of the rotation transmission mechanism 26, the valve shaft 22a rotates along with the valve shaft 23a rotated by the valve actuator 25 such that the main throttle valve 22 follows the opening operation of the sub-throttle valve 23. In this way, in a case where the throttle device 11 includes the main throttle valve 22 mechanically coupled to the throttle grip 17, the amount of air-intake supplied to the engine 10 can be ensured even when the grip position is in the fully closed position.

Figure 9:
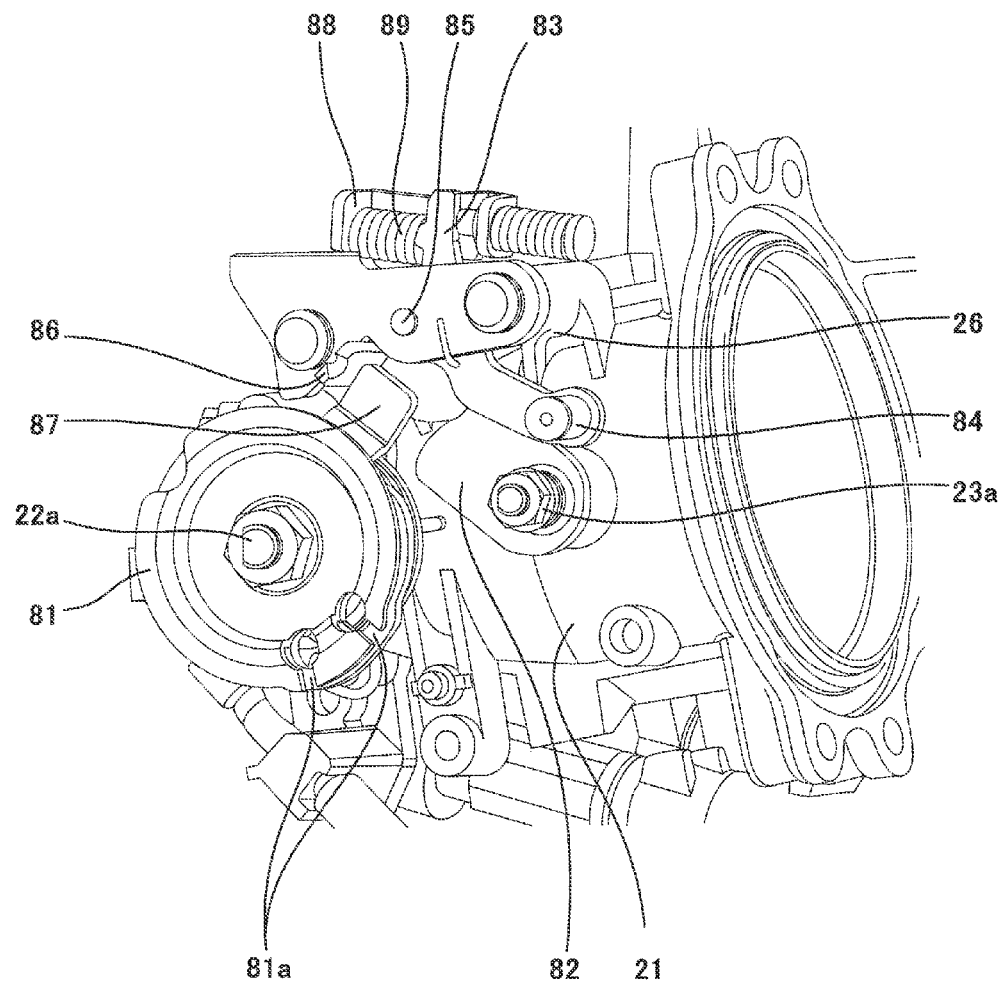
FIG. 9 is a perspective view of a throttle device, which is an example of a rotation transmission mechanism of FIG. 2.

FIG. 9 is a perspective view of the throttle device 11 showing an exemplary structure of the rotation transmission mechanism 26. As shown in FIG. 9, outside the air-intake pipe 21 of the throttle device 11, the valve shaft 22a of the main throttle valve 22 and the valve shaft 23a of the sub-throttle valve 23 are protrusively provided. A throttle pulley 81 having an engagement hole 81a for engaging the throttle wire 24 (see FIG. 2) therewith is attached to the end portion of the valve shaft 22a. The rotation transmission mechanism 26 is disposed outside the air-intake pipe 21 and positioned between the throttle pulley 81 and the end portion of the valve shaft 23a of the sub-throttle valve 23.

The rotation transmission mechanism 26 includes a cam 82 attached to the end portion of the valve shaft 23a such that the cam 82 is rotatable together with the valve shaft 23a. A first lever 84 is pivotally attached to a bracket 83 fastened to the outer surface of the air-intake pipe 21. The end portion of the first lever 84 is in contact with the outer peripheral surface of the cam 82. A second lever 86 is fastened to a pin 85 for pivotally coupling the first lever 84 to the bracket 83.

A protrusion 87 radially protrudes from the outer peripheral portion of the throttle pulley 81. The end portion of the second lever 86 is disposed engageably with the protrusion 87. The air-intake pipe 21 is provided with a spring fastening portion 88 for fastening a spring 89. A resilient force of the spring 89 fastened to the spring fastening portion 88 is exerted on the opposite end portion of the first lever 84 such that one end portion of the first lever 84 is biased to contact the outer peripheral surface of the cam 82.

When the valve shaft 23a rotates clockwise and the opening degree of the sub-throttle valve 23 increases from the opening degree corresponding to the fully closed position, the first lever 84 in contact with the cam 82 is pivoted against the force exerted by the spring 89. This causes the second lever 86 to be pivoted together with the first lever 84. Thereby, the end portion of the second lever 86 presses the protrusion 87, causing the throttle pulley 81 to be rotated. As a result, the valve shaft 22a is rotated. In this manner, the rotation transmission mechanism 26 operates to increase the opening degree of the main throttle valve 22.

Turning back to FIG. 2, the engine 10 is provided with a fuel feeding device 27 for injecting a fuel and an ignition device 28 for igniting an air-fuel mixture. The fuel feeding device 27 and the ignition device 28 operate at suitable timings to ignite and combust the air-fuel mixture within the cylinder, thereby enabling the engine 10 to generate a driving power (hereinafter also referred to as engine driving power). Typically, the engine driving power is greater when the throttle valve opening degree is greater, a fuel injection amount of the fuel feeding device 27 is greater and a timing at which the air-fuel mixture is ignited by the ignition device 28 is more advanced.

During running of the engine 10, an engine output shaft 29 rotates and its rotational power is transmitted to the rear wheel 3 via a driving power transmission path 30. On the driving power transmission 30, a reduction gear mechanism 31, a clutch 32, a transmission input shaft 33, a transmission 13, a transmission output shaft 34 and a chain 14, are arranged from upstream to downstream when viewed from the engine 10. By operating the clutch lever 18a, the clutch 32 is disengaged to inhibit the engine driving power from being transmitted on the driving power transmission path 30. The clutch 32 is provided with a back torque limiter 35 which is actuated to disengage the clutch 32 when a back torque transmitted from the rear wheel 3 toward the engine output shaft 29 becomes excessive.

The transmission 13 is hand-operated. The driver depresses a shift pedal 18b to select one from among plural transmission gear positions. The transmission 13 changes the speed of the rotational power of the transmission input shaft 33 with a change gear ratio corresponding to the transmission gear position set in the transmission 13 and transmits the resulting driving power to the transmission output shaft 34. There are a plurality of forward driving transmission gear positions (in the present embodiment six forward driving transmission gear positions) with reduction gear ratios different from each other and a neutral position at which the driving power is inhibited from being transmitted from the transmission input shaft 33 to the transmission output shaft 34.

The front wheel 2 and the rear wheel 3 are provided with a front wheel brake 36 and a rear wheel brake 37, respectively. The front wheel brake 36 is actuated by a hydraulic front wheel brake actuator 38, while the rear wheel brake 37 is actuated by a hydraulic rear wheel brake actuator 39. When the driver operates the brake lever 19a and depresses the brake pedal 19b, a hydraulic pressure of the front wheel brake actuator 38 and a hydraulic pressure of the rear wheel brake actuator 39 increase and actuate the front brake 36 and the rear brake 37, which brake the front wheel 2 and the rear wheel 3, respectively.

The deceleration control system 100 includes a plurality of sensors or switches for detecting driving states of the motorcycle 1, a braking electronic control unit 50 (hereinafter referred to as "braking ECU 50"), the engine ECU40, the throttle device 11, the fuel feeding device 27 and the ignition device 28.

The sensors or switches for detecting the driving states include a grip position sensor 41 for detecting a grip position, a main throttle valve position sensor 42 for detecting the opening degree of the main throttle valve 22, a sub-throttle valve position sensor 43 for detecting the opening degree of the sub-throttle valve 23, an engine speed sensor 44 for detecting an engine speed, a gear position sensor 45 for detecting a transmission gear position, a limiter switch 46 for detecting whether or not the back torque limiter 35 is actuated, a brake lever switch 47 for detecting whether or not the brake lever 19*a* is operated, and a brake pedal switch 48 for detecting whether or not the brake pedal 19*b* is depressed. The detected signals of the sensors and switches are input to the engine ECU 40.

The braking ECU 50 is a control unit for controlling a combined braking system (CBS) or an antilock braking system (ABS) and is coupled to the front wheel brake actuator 38 and to the rear wheel brake actuator 39. The braking ECU 50 is further coupled to a front wheel speed sensor 51 for detecting the rotational speed of the front wheel 2, to a rear wheel speed sensor 52 for detecting the rotational speed of the rear wheel 3, and to a front wheel brake pressure sensor 53 for detecting the hydraulic pressure (oil pressure) of the front wheel brake 36. The braking ECU 50 is further coupled to the engine ECU 40, and the detected signals of the sensors 51 to 53 are input to the engine ECU 40 via the braking ECU 50.

The engine ECU 40 includes a memory 61, a throttle controller 62, a fuel controller 63, an ignition controller 64, a deceleration start detector 65 and a switching controller 60. The memory 61 contains control maps for deriving a target opening degree of the sub-throttle valve 23, a target fuel amount of the fuel injected by the fuel feeding device 27, a target timing of ignition performed by the ignition device 28, etc., according to the driving state. The throttle controller 62 derives the target opening degree of the sub-throttle valve 23 with reference to the control map and controls the valve actuator 25 of the sub-throttle valve 23 so that an actual opening degree of the sub-throttle valve 23 reaches a target opening degree. In the same manner, the fuel controller 63 and the ignition controller 64 control the fuel feeding device 27 and the ignition device 28, respectively. By controlling the devices according to the control maps, the engine driving power is controlled according to the driving state of the motorcycle 1.

The control maps stored in the memory 61 include a normal state map A, and a deceleration state map B different from the normal state map A. The normal state map A is a control rule expected to be referred to, in a state where no back torque is generated and the driving power is transmitted from the engine 10 to the rear wheel 3. The deceleration state map B is a control rule expected to be referred to, in a state where a back torque is generated and the driving power is transmitted from the rear wheel 3 toward the engine 10. The deceleration start detector 65 is capable of detecting that deceleration of the motorcycle 1 has started, according to the detected signals of the sensors and switches for detecting the driving state of the motorcycle 1. As described later, the deceleration start detector 65 determines whether or not a deceleration start condition that the driver has performed an operation for starting the deceleration is met and detects that deceleration of the motorcycle 1 has started, when it is determined that the deceleration start condition is met. In particular, the deceleration start detector 65 detects whether or not deceleration caused by the back torque has started, based on an amount of the operation member operated by the driver. The switching controller 60 is capable of switching the control map to be referred to by the throttle controller 62, the fuel controller 63 and the ignition controller 64 from the normal state map to the deceleration state map, when the deceleration start detector 65 detects that the motorcycle 1 has started to be decelerated. The controllers 62 to 64 control the valve actuator 25, the fuel feeding device 27 and the ignition device 28 according to the deceleration state map based on the detected signals from the sensors for detecting the driving states.

A shifting permission switch 20 operated by the driver is positioned adjacent to an instrument (gauge) attached to a center of the handle 6 (see FIG. 1). When the driver operates the shifting permission switch 20 to inhibit switching of the control map, the switching controller 60 can be disenabled. Hereinafter, discussion will be given of a case where the driver operates the shifting permission switch 20 to permit the control map to be switched.

Figure 3:
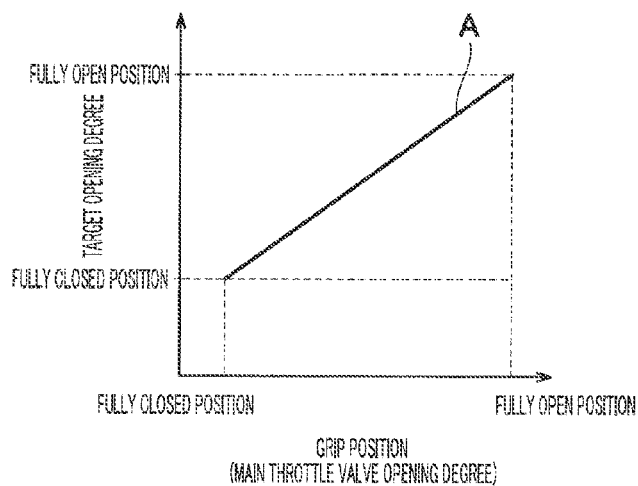
FIG. 3A is a graph showing an exemplary normal state control map for deriving a target opening degree of a sub-throttle valve which is stored in a memory of FIG. 2.
FIG. 3B is a graph showing an exemplary deceleration state control map for deriving a target opening degree of the sub-throttle valve which is stored in the memory of FIG. 2.
Figure 3:
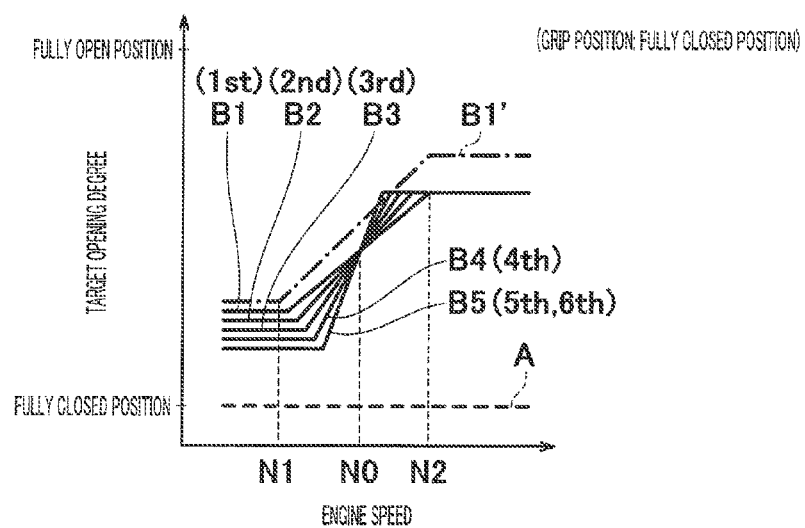

FIGS. 3A and 3B are graphs each showing the control map for deriving the target opening degree of the sub-throttle valve 23, among the control maps stored in the memory 61 of the engine ECU 40 of FIG. 2. With reference to FIGS. 3A and 3B, in the memory 61, the normal state map A and deceleration state maps B1 to B5 different from the normal state map A are stored as the control maps for deriving the target opening degree of the sub-throttle valve 23.

In FIGS. 3A and 3B, for the sake of clarity, the control maps are depicted in a coordinate system in which a vertical axis indicates a target opening degree and a horizontal axis indicates a parameter for deriving the target opening degree. Alternatively, the relationship (rule) shown in FIGS. 3A and 3B may be expressed as a table (data base) and the table may be stored in the memory 61, or it may be expressed in mathematical formula forms and may be stored in the memory 61.

As shown in FIG. 3A, when the normal state map A is referred to, the target opening degree of the sub-throttle valve 23 is derived according to the grip position of the throttle grip 17. When the throttle grip 17 is released (the driver terminates the operation of the throttle grip 17) and the grip position is in the fully closed position, the target opening degree is in a fully closed position, while when the grip position is in a fully open position, the target opening degree is in a fully open position. During a period of time when the grip position changes from the fully closed position to the fully open position, the target opening degree changes from the fully closed position to the fully open position in proportion to the grip position.

FIG. 3B represents the five deceleration state maps B1 to B5 by solid lines. The switching controller 60 selects one from among these five deceleration state maps B1 to B5 when it switches the control map from the normal state map to the deceleration state map. As described later, the control map is selected in such a manner that the first, second, third, and fourth deceleration state maps B1, B2, B3 and B4 correspond to a first gear position, a second gear position, a third gear position and a fourth gear position in the transmission 13, respectively, and the fifth deceleration state map B5 corresponds to a fifth gear position and a sixth position in the transmission 13.

When any one of the deceleration state maps B1 to B5 is referred to, the target opening degree is derived according to the engine speed irrespective of the grip position. The first to fifth deceleration state maps B1 to B5 have the same tendency that the target opening degree is greater than a value corresponding to the fully closed position in an engine speed range in which the engine speed is lower than a first engine speed higher than an idling engine speed. Although in the deceleration state maps B1 to B5 in FIG. 3, the target opening degrees corresponding to that engine speed range are constant, they may change according to a change in the engine speed. In an engine speed range in which the engine speed is higher than or equal to the first engine speed, the target opening degree increases with an increase in the engine speed. Although in the example shown in FIG. 3B, the target opening degree rises linearly, it may rise non-linearly. Although the target opening degree is constant in an engine speed range in which the engine speed is higher than or equal to a second engine speed higher than the first engine speed, such a constant opening degree interval may be omitted.

In FIG. 3B, for the purpose of comparison, the normal state map A in a case where the grip position is in the fully closed position is indicated by a broken line. In this case, the target opening degree derived according to the normal state map A is the opening degree corresponding to the fully closed position, irrespective of the engine speed. Therefore, in a driving state in which the grip position is in the fully closed position (from this driving state, it is estimated that the deceleration of the motorcycle 1 has started), the engine driving power corresponding to the target opening degree decided according to the deceleration state map is greater than the engine driving power corresponding to the target opening degree decided according to the normal state map.

With the above method, the engine driving power can be made greater than that in a case where the target opening degree continues to be decided according to the normal state map after it is detected that the deceleration of the motorcycle 1 has started. This makes it possible to suitably mitigate the deceleration caused by the back torque. There is a tendency that the engine speed increases significantly and the degree of deceleration due to the back torque is great if the back torque is great, after it is detected that the deceleration of the motorcycle 1 has started. According to the deceleration state maps B1 to B5 of the present embodiment, the target opening degree is greater as the engine speed is higher in an interval between the first engine speed and the second engine speed so that an increasing magnitude of the engine driving power is greater as the engine speed is higher. In this way, the degree to which the deceleration of the motorcycle 1 is mitigated can be controlled properly according to the engine speed.

When comparison is made between the deceleration state maps B1 to B5, in a case where the engine speed is lower than or equal to the engine speed N1, a target opening degree derived according to a certain engine speed with reference to a particular deceleration state map (e.g., second deceleration state map B2) is less than a target opening degree derived according to the certain engine speed with reference to a deceleration state map (e.g., any one of the third to fifth deceleration state maps B3 to B5) corresponding a transmission gear position with a lower reduction gear ratio than a transmission gear position corresponding the particular deceleration state map. The value of the engine speed N1 is greater than the value of the first engine speed. There is a tendency that when the reduction gear ratio of the transmission 13 is higher, the magnitude of the back torque is greater and the degree of deceleration is greater. The deceleration state maps B1 to B5 in the present embodiment are defined in such a manner that an increasing magnitude of the engine driving power is greater as the reduction gear ratio is higher. This allows the degree to which the deceleration is mitigated to be controlled properly according to the reduction gear ratio.

Although the map for deriving the target opening degree of the sub-throttle valve 23 is exemplarily described as the control map in the present embodiment, the engine driving power may be increased according to other method. For example, the control for increasing the engine driving power may be performed after it is detected that deceleration of the motorcycle 1 has started, in such a manner that the target fuel amount decided according to the deceleration state map is greater than the target fuel amount decided according to the normal state map, or a target timing decided according to the deceleration state map may be advanced with respect to a target timing decided according to the normal state map.

Figure 4:
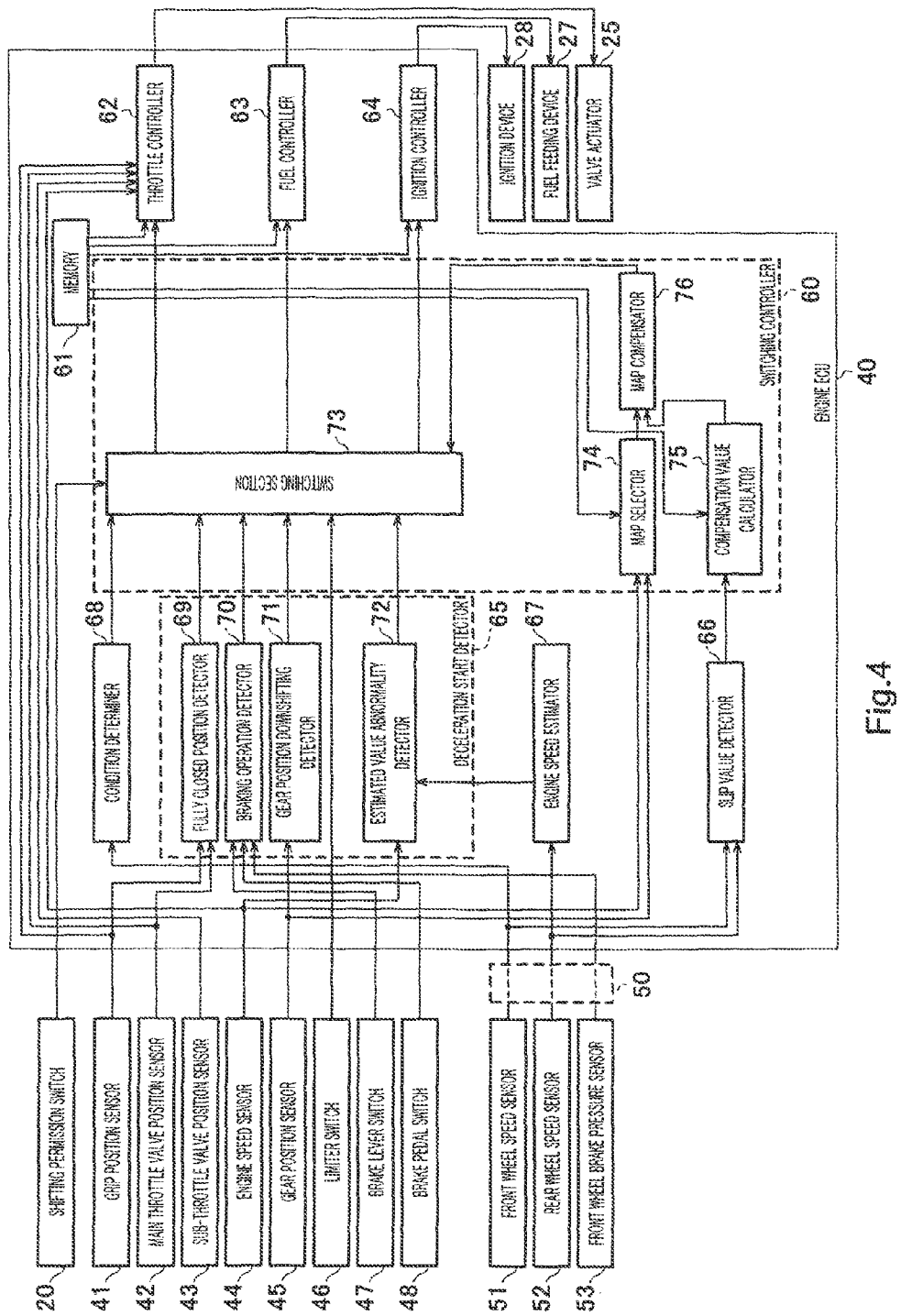
FIG. 4 is a view showing a configuration of an engine ECU in the deceleration control system of FIG. 2.
Figure 5:
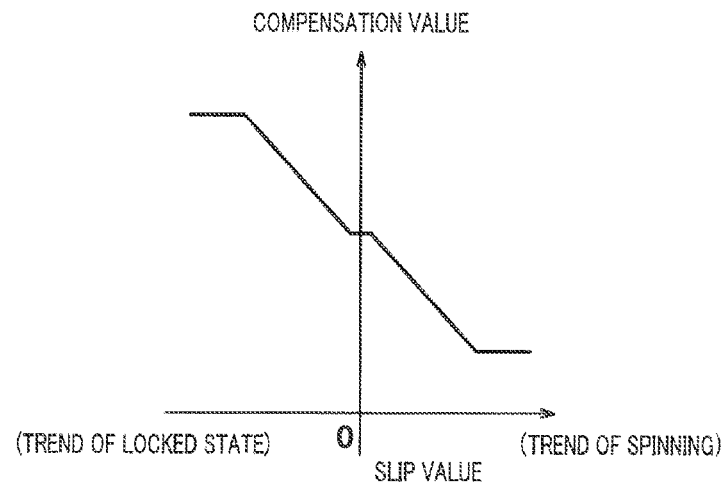
FIG. 5A is a graph showing an exemplary compensation value calculating map stored in the memory of FIG. 2.
FIG. 5B is a graph showing an exemplary compensation value calculating map stored in the memory of FIG. 2.
Figure 5:
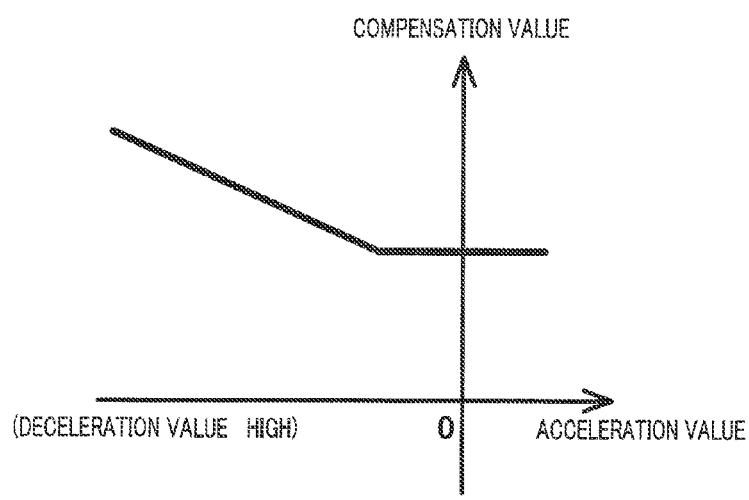

With reference to FIGS. 4 to 8, the operation of the deceleration start detector 65 and the operation of the switching controller 60 will be discussed in greater detail with reference to FIGS. 4 to 8. FIG. 4 is a view primarily showing a configuration of the engine ECU 40, in the deceleration control system 100 of FIG. 2. Referring to FIG. 4, the engine ECU 40 includes a condition determiner 68, an engine speed estimator 67 and a slip value detector 66, in addition to the deceleration start detector 65 and the switching controller 60. The deceleration start detector 65 includes a fully closed position detector 69, a braking operation detector 70, a gear position downshifting detector 71 and an estimated value abnormality detector 72, to estimate that the motorcycle 1 has started to be decelerated. The switching controller 60 includes a switching section 73, a map selector 74, a compensation value calculator 75 and a map compensator 76.

The condition determiner 68 determines whether or not a precondition used for switching from the normal state map to the deceleration state map is met. In the present embodiment, the precondition is such that the motorcycle 1 is driving and is being decelerated. The condition determiner 68 determines whether or not the motorcycle 1 is driving and whether or not the motorcycle 1 is being decelerated. This makes it possible to avoid an opportunity that control for attenuating an engine braking force (mitigating intensity of engine braking) is initiated in a state where the motorcycle 1 is in a stopped state or is being accelerated.

To be specific, in a former case, the condition determiner 68 determines whether or not the rotational speed of the front wheel 2 detected by the front wheel speed sensor 51 is higher than or equal to a predetermined speed. The value of this predetermined speed is greater than 0. In a latter case, the condition determiner 68 determines whether or not a value corresponding to a rotational acceleration of the front wheel 2 which is calculated from the rotational speed of the front wheel 2 detected by the front wheel speed sensor 51 is less than a predetermined value. The value corresponding to the rotational acceleration of the front wheel 2 may be a difference value between a current value and a past value or may be calculated by dividing this difference value by a period of time from a time point when the past value is obtained until a time point when the current value is obtained. This predetermined value is a value less than 0.

Since the control is performed using the deceleration state map to, for example, attenuate the engine braking force, the precondition may include that the transmission gear position detected by the gear position sensor 45 is a specified lower gear position (e.g., first gear position or second gear position). In a state where a lower gear position is set in the transmission 13, a greater engine braking force is more likely to be generated. If the precondition includes that the transmission gear position is the specified low gear position as described above, the control using the deceleration state map is executed when a greater engine braking force is more likely to be generated, thereby effectively attenuating the engine braking force.

The fully closed position detector 69 determines whether or not the grip position is in the fully closed position. As described above, the throttle grip 17 is an acceleration operation member with which the driver inputs the acceleration request command to the engine ECU 40. When the driver's operation of the throttle grip 17 terminates (throttle grip 17 is not actuated) and the grip position is in the fully closed position, it is most likely that the driver is going to start deceleration of the motorcycle 1. Therefore, it may be estimated that the driver has performed the operation for starting to decelerate the motorcycle 1, from the fact that the grip position is in the fully closed position. As used herein, the phrase "the driver terminates the operation of an acceleration operation member or the acceleration operation member is not actuated" is meant to include an operation for issuing a command to implement an idling engine speed, and an operation for issuing a command to implement a state where the rotational speed of the driving power output from the driving power source is a minimum rotational speed, a stand-by rotational speed during a stopped state of the motorcycle 1, or zero. Although it is estimated that the driver has performed the operation for starting to decelerate the motorcycle 1, from the fact that the grip position is in the fully closed position, it may alternatively be estimated that this has been done when a time rate of change in the operation of the acceleration operation member performed to accelerate the motorcycle 1, is greater than or equal to a predetermined amount.

Since the opening degree of the main throttle valve 22 corresponds to the grip position, the fully closed position detector 69 may determine that the grip position is in the fully closed position based on the detected signal from the main throttle valve position sensor 42.

The braking operation detector 70 determines whether or not the front wheel brake 36 or the rear wheel brake 37 is actuated according to an operation performed by the driver to actuate the front wheel brake 36 or the rear wheel brake 37. To be specific, for example, the braking operation detector 70 determines whether or not a hydraulic pressure detected by the front wheel brake pressure sensor 53 is higher than or equal to a predetermined pressure value. This predetermined pressure is a pressure value with which the front wheel brake 36 is activated to brake the front wheel 2. When the front wheel brake 36 is actuated, it is most likely that the driver has performed a braking operation for starting to decelerate the motorcycle 1. Therefore, it may be estimated that the driver has performed a braking operation for starting to decelerate the motorcycle 1, based on the fact that the hydraulic pressure is higher than or equal to the predetermined pressure value. Alternatively, the braking operation detector 70 may be configured to determine whether or not the driver has operated the brake lever 19a or the brake pedal 19b based on the detected signal from the brake lever switch 47 or the detected signal of the brake pedal switch 48, respectively. Or, the brake lever switch 47 or the brake pedal switch 48 may be regarded as a device for detecting whether or not the deceleration of the motorcycle 1 has started, and the detected signals may be input to the switching section 73.

The gear position downshifting detector 71 determines whether or not gear change operation for increasing a reduction gear ratio (i.e., downshifting) based on a current value and a past value of the transmission gear position which are detected by the gear position sensor 45. There is a tendency that the reduction gear ratio becomes higher and the vehicle speed becomes higher by downshifting of the gear position. It should be noted that in the hand-operated transmission 13 in the present embodiment, the transmission gear position is not changed without the driver's manual operation of the transmission 13. Therefore, it may be estimated that the driver has performed the operation for starting to decelerate the motorcycle 1, based on the fact that the transmission gear position has been downshifted.

The estimated value abnormality detector 72 compares the detected value of the engine speed which is detected by the engine speed sensor 44 to the estimated value of the engine speed which is estimated by the engine speed estimator 67 and determines whether or not the detected value is a predetermined magnitude greater than the estimated value. In other words, the estimated value abnormality detector 72 determines whether or not a deviation between the detected value of the engine speed and the estimated value of the engine speed falls within an allowable (permissible) range or whether or not an absolute value of the deviation is less than a predetermined value. The estimated value of the engine speed is calculated by multiplying the rotational speed of the rear wheel 3 detected by the rear wheel speed sensor 52 by a change gear ratio of the rear wheel 3 with respect to the engine output shaft 29. The estimated value may be calculated based on a rotational speed of a rotary member provided on the driving power transmission path 30, instead of the rotational speed of the rear wheel 3. A state where there is a substantial deviation between the detected value and the estimated value implies that there is a deviation between the rotational speed of the engine output shaft 29 and the rotational speed of the rear wheel 3, which deviation occurs because of a slack between driving power transmission members in a mechanism on the driving power transmission path 30, when the torque generated in the engine 10 fluctuates. It is most likely that this state is a state immediate before deceleration caused by occurrence of a back torque is going to start. Therefore, it may be determined that the deceleration of the motorcycle 1 has started, based on the fact that the estimated value of the engine speed falls outside an allowable (permissible) range. If the back torque is generated in excess, the back torque limiter 35 is actuated. Therefore, it may be estimated that deceleration of the motorcycle 1 has started, based on the fact that the limiter switch 46 detects that the back torque limiter 35 is actuated.

The switching section 73 decides which of the normal state map and the deceleration state map should be referred to by the throttle controller 62 and other controllers, based on a result of the determination performed by the condition determiner 68, the detected signal from the fully closed position detector 69, the detected signal from the braking operation detector 70, the detected signal from the gear position downshifting detector 71, the detected signal from the estimated value abnormality detector 72 and the detected signal from the limiter switch 46.

The map selector 74 selects the deceleration state map corresponding to the transmission gear position detected by the gear position sensor 45. When the transmission gear position is a first gear position, a second gear position, a third gear position, or a fourth gear position, the map selector 74 selects the first deceleration state map B1, the second deceleration state map B2, the third deceleration state map B3 or the fourth deceleration state map B4, respectively. The map selector 74 selects the fifth deceleration state map B5 when the transmission gear position is a fifth gear position or a sixth gear position.

The slip value detector 66 detects a slip value representing the degree to which the rear wheel 3, which is the drive wheel, slips. For example, the slip value is calculated by subtracting the rotational speed of the front wheel 2 detected by the front wheel speed sensor 51 from the rotational speed of the rear wheel 3 detected by the rear wheel speed sensor 52, and by dividing the resulting value by the rotational speed of the front wheel 2. The compensation value calculator 75 calculates a compensation value of the deceleration state map according to the detected slip value, with reference to the compensation value map stored in the memory 61. The map compensator 76 compensates the deceleration state map selected by the map selector 74 using the compensation value calculated by the compensation value calculator 75. The map compensator 76 compensates the deceleration state map by multiplying the target opening degree to be derived with reference to the selected deceleration state map, by the compensation value.

FIGS. 5A and 5B are graphs showing exemplary compensation value maps stored in the memory 61. Referring to FIG. 5A, the compensation value is set to 1 when the slip value is 0, i.e., when there is no substantial rotational speed difference between the rear wheel 3 and the front wheel 2 and the motorcycle 1 is driving in a relatively good condition. In this case, the deceleration state map stored in the memory 61 is not compensated. The compensation value is set to a value greater than 1 when the slip value is negative, i.e., the rotational speed of the rear wheel 3 is less than the rotational speed of the front wheel 2 and the rear wheel 3 tends to be locked. The compensation value is set to a value smaller than 1 when the slip value is positive, i.e., the rotational speed of the rear wheel 3 is greater than the rotational speed of the front wheel 2 and the rear wheel 3 tends to be spinning out. As shown in FIG. 5B, the compensation value is set to 1 when deceleration value (degree) (negative acceleration value (degree)) of the vehicle is approximately zero. In this case, the deceleration state map stored in the memory 61 is not compensated. The compensation value is set to a value greater than 1 and the compensation value is greater as the deceleration value is greater, when the deceleration value is greater than a predetermined value (acceleration degree is less than a predetermined negative value). Although the compensation value is decided according to the deceleration value, another suitable value may be used so long as it corresponds to a speed change per unit time after deceleration caused by the back torque starts.

FIG. 3B shows a compensated first deceleration state map B1' in a case where the compensation value is a value greater than 1. The compensated first deceleration state map B1' shifts according to the first deceleration state map B1 before compensation. In other words, the target opening degree derived according to a certain engine speed with reference to the compensated first deceleration state map B1' is a value derived by multiplying the compensation value, the target opening degree derived according to this engine speed with reference to the first deceleration state map B1 before compensation. When the rotational speed of the rear wheel 3 is lower than the rotational speed of the front wheel 2, the target opening degree is compensated to be greater. Therefore, a greater torque is generated to enable the motorcycle 1 to drive while substantially gripping the road surface. When the rotational speed of the rear wheel 3 is higher than the rotational speed of the front wheel 2, the target opening degree is compensated to be smaller. Therefore, it is possible to prevent the generated torque transmitted to the rear wheel 3 from becoming excessive and to suitably suppress the rear wheel 3 from spinning out.

When the switching section 73 decides that the control map to be referred to is the normal state map, the controllers 62, 63, and 64 control the valve actuator 25, the fuel feeding device 27, and the ignition device 28 according to the normal state map stored in the memory 61. On the other hand, when the switching section 73 decides that the control map to be referred to is the deceleration state map, the controllers 62, 63, and 64 control the valve actuator 25, the fuel feeding device 27, and the ignition device 28 according to the deceleration state map compensated by the map compensator 76.

Figure 6:
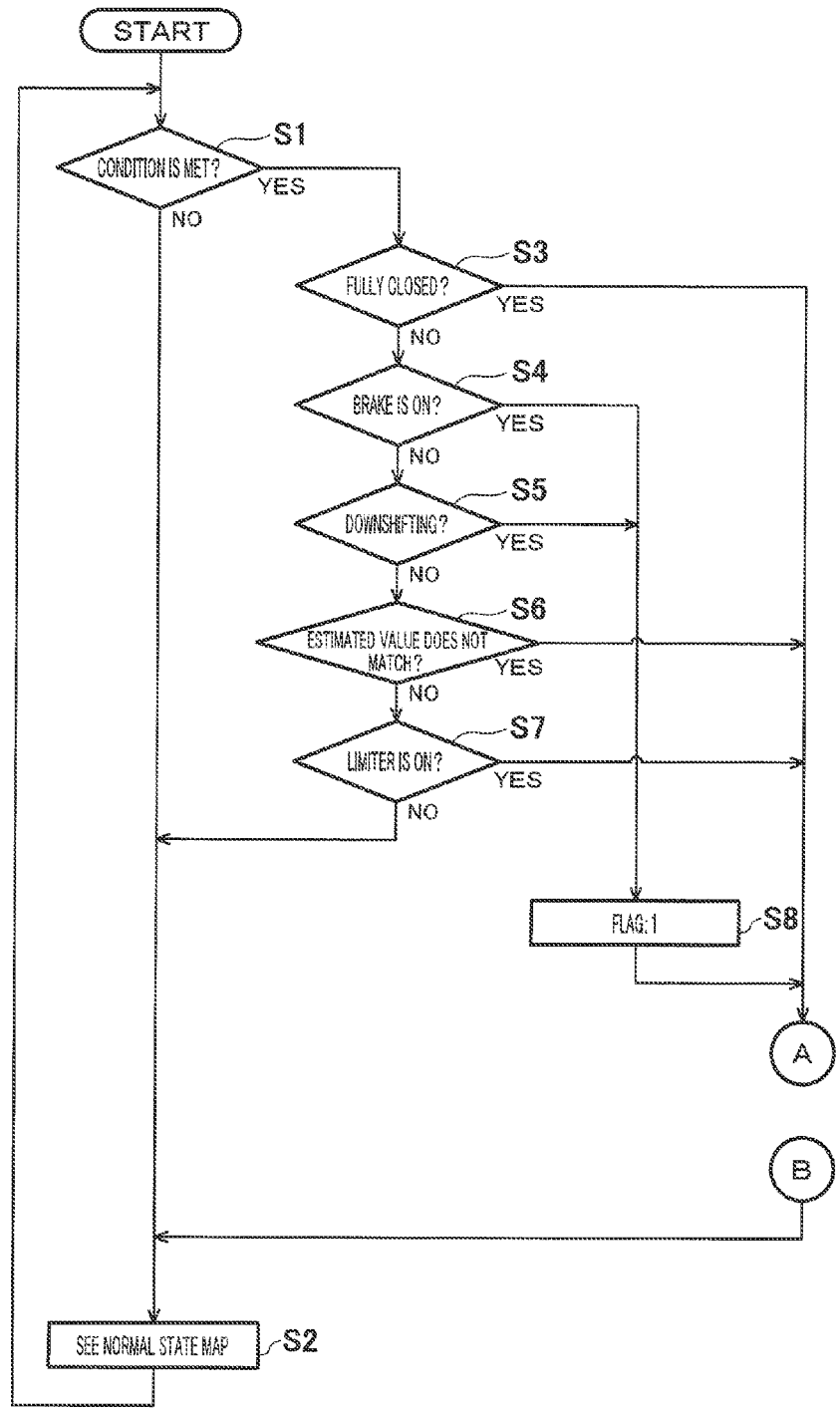
FIG. 6 is a flowchart showing a control procedure performed by an engine ECU of FIG. 4.
Figure 7:
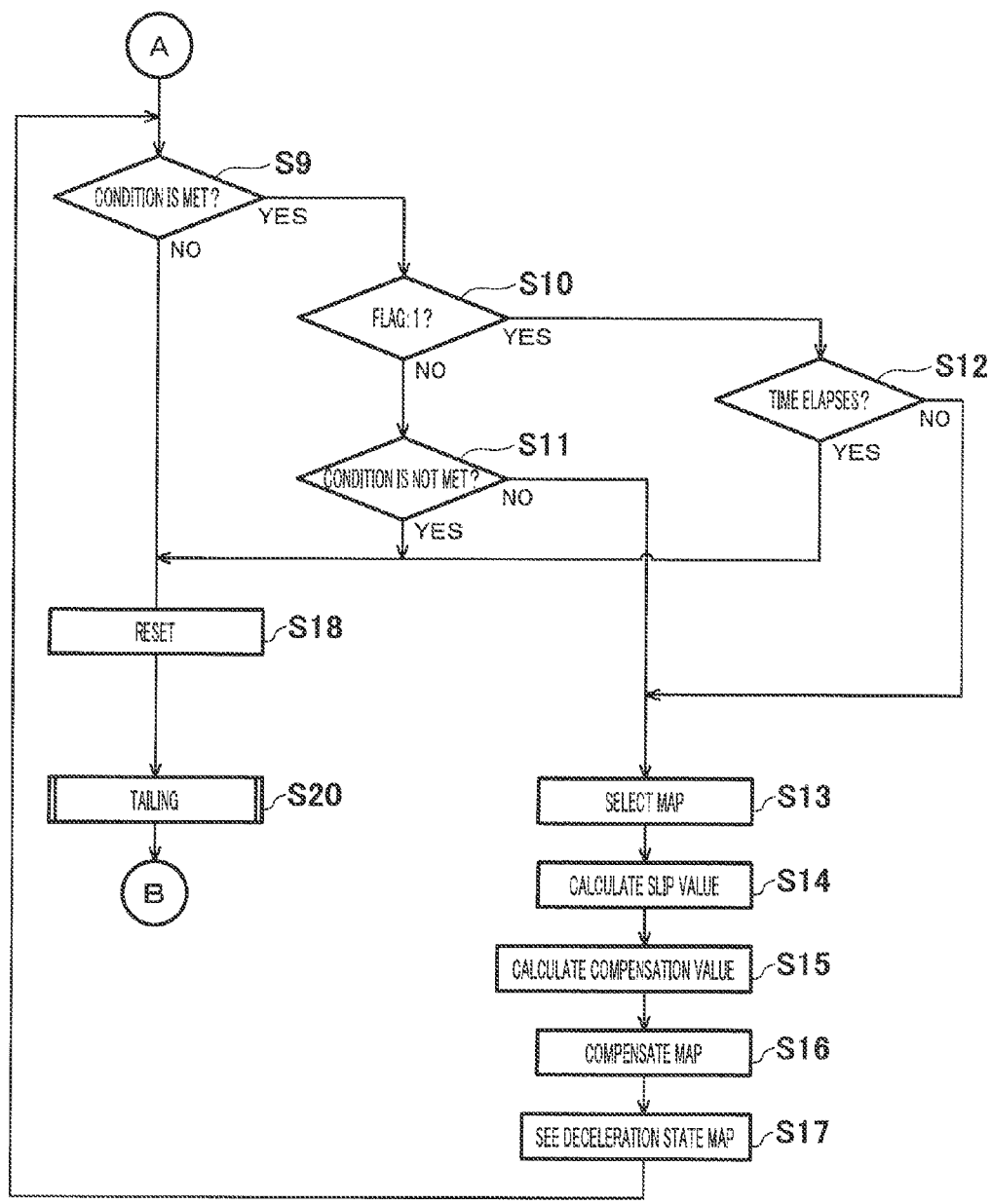
FIG. 7 is a flowchart showing a control procedure performed by the engine ECU of FIG. 4.

FIGS. 6 and 7 are flowcharts showing a control procedure executed by the engine ECU 40. FIG. 6 illustrates a control procedure executed according to the normal state map and a control procedure executed to determine whether or not a condition used for switching the control map from the normal state map to the deceleration state map is met. FIG. 7 illustrates a control procedure executed according to the deceleration state map and a control procedure executed to determine whether or not a condition used for switching the control map from the deceleration state map to the normal state map is met. When the driver turns ON an ignition switch of the motorcycle 1, the normal state map is selected as the control map and step S1 of FIG. 6 starts.

Initially, it is determined whether or not a precondition is met (step S1). If No in step S1, it is determined that the condition used for switching the control map from the normal state map to the deceleration state map is not met and the normal state map is kept as the control map (step S2). Then, the process returns to step S1 and step S1 is resumed.

On the other hand, if Yes in step S1, it is determined whether or not the grip position is in the fully closed position (step S3). If No in step in step S3, it is determined whether or not the brake is actuated (step S4). If No in step S4, it is determined whether or not the gear position is downshifted (step S5). If No in step S5, it is determined whether or not the estimated value of the engine speed falls outside an allowable range (step S6). If No in step S6, it is determined whether or not the back torque limiter 35 is actuated (step S7). If No in step S7, it is determined that the condition used for switching the control map from the normal state map to the deceleration state map is not met and the normal state map is kept as the control map (step S2). The process returns to step S1 and step S is resumed.

If Yes in step S3 (grip position is in the fully closed position), if Yes in step S4 (brake is actuated), if Yes in step S5 (gear position is downshifted), if Yes in step S6 (estimated value of the engine speed falls out of the allowable range), or if Yes in step S7 (back torque limiter 35 is actuated), then it is determined that the condition used for switching the control map from the normal state map to the deceleration state map is met, and the process proceeds to reference symbol A. If it is determined that the gear position has been downshifted, or it is determined that the brake is actuated, a value of a flag is set to 1 (step S8), and then the process proceeds to the reference symbol A.

Referring to FIG. 7, after proceeding to the reference symbol A, it is determined whether or not the precondition is met (step S9). If Yes in step S9, it is determined whether or not the value of the flag is 1 (step S10).

If No in step S10, it is determined whether or not the condition used for proceeding to the reference symbol A is not met (step S11). A case where the value of the flag is not 1 and the process proceeds to the reference symbol A is a case where the condition that the grip position is in the fully closed position is met, a case where the condition that the estimated value of the engine speed falls outside the allowable range is met, or a case where the condition that the back torque limiter 35 is actuated is met. For example, if it is determined that the condition associated with the grip position is met and the process proceeds to the reference symbol A, in step S11, it is determined whether or not this condition is not met, to be precise, the grip position is not in the fully closed position, and determination as to whether or not another condition different from this condition is met is not carried out. If No in step S11 (the condition is still met), the process proceeds to step S13.

On the other hand, if Yes in step S10, it is determined whether or not a predetermined period of time elapses from a time point when the condition used for switching the control map from the normal state map to the deceleration state map is met (step S12). If No in step S12, the process proceeds to step S13.

In step S13, a deceleration state map (see FIG. 3B) corresponding to a transmission gear position detected by the gear position sensor 45 is selected. A slip value is detected (step S14). A compensation value is calculated according to the detected slip value and a deceleration value with reference to the compensation value map (see FIGS. 5A and 5B) (step S15). The selected deceleration state map is compensated using the compensation value (step S16). As the control map, the compensated deceleration state map is used (step S17). Then, the process returns to step S9 and step S9 is resumed.

Assume that the process resumes from step S9 rather than step S1. If it is determined that the precondition is not met (No in step S9), it is determined that the condition used for switching the control map from the deceleration state map to the normal state map is met and the value of the flag is reset (step S18). Then, tailing control is initiated (step S20). The tailing control is to change the engine driving power so that the engine driving power gradually gets closer over time to the driving power to be decided according to the normal state map. In the present embodiment, an actual opening degree of the sub-throttle valve 23 is controlled to be changed so that the actual opening degree of the sub-throttle valve 23 gradually gets closer over time to the target opening degree decided according to the normal state map. At a time point when the engine driving power matches the driving power decided according to the normal state map by the tailing control, the process proceeds to a reference symbol B. The tailing control makes it possible to gradually reduce a deviation between the engine driving power at a time point when the condition used for switching the control map from the deceleration state map to the normal state map is met and the value decided according to the normal state map, thereby keeping a state where the driver feels good driving feeling. After proceeding to the reference symbol B, the normal state map is used as the control map (step S2). The process returns to step S1 and step S1 is resumed.

In the case where the process resumes from step S9, if Yes in step S9 (precondition is met), No in step S10 (value of flag is not 1), and Yes in step S11 (condition is not met), it is determined that the condition used for switching the control map from the deceleration state map to the normal state map is met and the process proceeds to step S18, step S20, and step S2, and returns to step S1. Then, step S1 is resumed. If Yes in step S9 (precondition is met), Yes in step S10 (value of flag is 1), and Yes in step S12 (predetermined time elapses), it is determined that the condition used for switching the control map from the deceleration state map to the normal state map is met and the process proceeds to step S18, step S20, and step S2, and returns to step S1. Then, step S1 is resumed.

Figure 8:
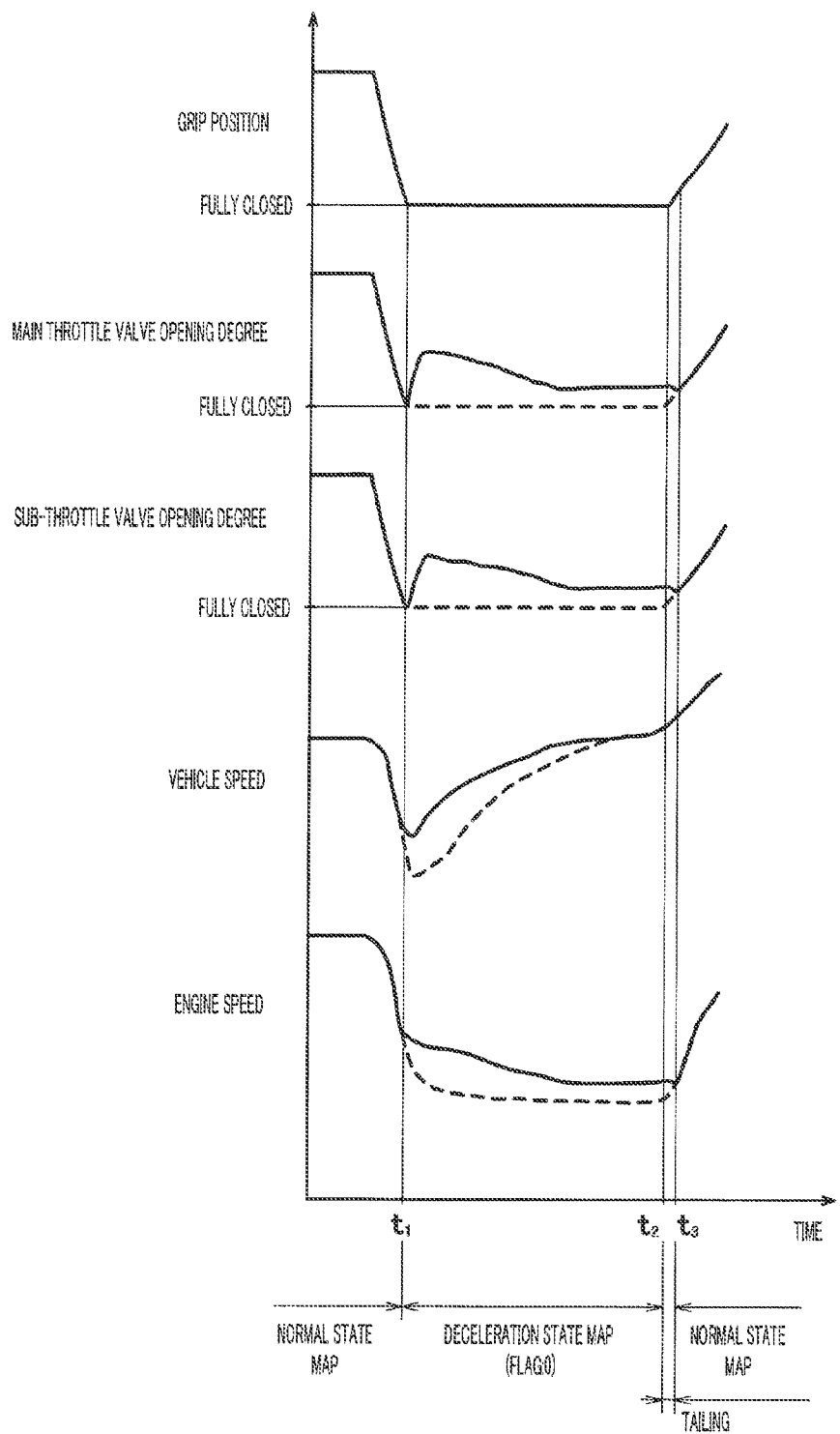
FIG. 8 is a timing chart showing exemplary changes in driving states which occur when the control shown in FIGS. 6 and 7 is performed.

FIG. 8 is a timing chart showing exemplary changes in driving states which occur when the flowcharts of FIGS. 6 and 7 are executed.

Referring to FIG. 8, while the grip position is changing from a certain operated position toward the fully closed position, the opening degree of the main throttle valve 22 changes substantially in proportion toward the fully closed position in response to a change in the grip position, and the opening degree of the sub-throttle valve 23 controlled according to the normal state map changes toward the fully closed position. Correspondingly, the torque generated in the engine 10 and the engine speed decrease. When the grip position reaches the fully closed position, the control map is switched from the normal state map to the deceleration state map. From this point, the target opening degree of the sub-throttle valve 23 is derived with reference to the deceleration state map irrespective of the grip position. The target opening degree derived with reference to the deceleration state map is greater than the target opening degree decided according to the normal state map. This can reduce a pumping loss and prevent the torque generated in the engine 10 and the engine speed from decreasing rapidly, and hence attenuate an engine braking force (mitigate the intensity of engine braking). Especially in the present embodiment, because of the operation of the rotation changing mechanism 26, the opening degree of the main throttle valve 22 changes according to the opening degree of the sub-throttle valve 23, although the grip position is in the fully closed position. This can attenuate the engine braking force more effectively.

During the control executed with reference to the deceleration state map, when the grip position is not in the fully closed position (see time t2), it is determined that the condition used for switching the control map from the deceleration state map to the normal state map is met and the tailing control is initiated. At a time point when the actual opening degree of the sub-throttle valve 23 matches the target opening degree decided according to the normal state map (see time t3), the control is executed using the normal state map. In this way, when the driver inputs an acceleration request command, the control map is switched from the deceleration state map to the normal state map in response to the request command. Thus, the deceleration of the motorcycle 1 can be controlled properly in response to driver's operation.

The above effect of mitigating the degree of the deceleration is achieved when the estimated value of the engine speed falls outside the allowable range and when the back torque limiter is actuated. When the transmission gear position is downshifted and the brake is actuated, a state where the control is executed in accordance with the decelerated state map is maintained, for a predetermined period of time which elapses from a time point when the control map is switched from the normal state map to the deceleration state map. This can avoid a problem that the control map cannot be switched to the normal state map in a situation in which a gear change operation will not be performed for a long period of time after the downshifting or a situation in which the brake will not be actuated for a long period of time after the braking operation. In addition, it is possible to avoid an opportunity that the control map is switched to the normal state map immediately even though a brake is actuated for a very short moment.

Although the above description has been given of the embodiment of the present invention, the above configuration may be suitably altered within a scope of the invention. For example, the switching section 73 determines whether or not to switch the control map based on a result of the determination of the condition determiner 68 and five results of the detection from the four detectors and the limiter switch, it may determine whether or not to switch the control map based on two or more of the five results of detection, or one of the five results of detection.

The throttle device is not limited to the above embodiment so long as the throttle device can ensure an air-intake amount irrespective of the grip position when the engine driving power is increased by increasing the amount of intake-air to the engine 10 during deceleration. The above rotation changing mechanism 26 may be omitted in a tandem throttle device including for each cylinder a throttle valve actuated in response to the operation of the throttle grip and a throttle valve actuated by a valve actuator.

Instead of the tandem throttle device, a multi-cylinder engine may incorporate a throttle device, in which throttle valve(s) corresponding to one or more cylinders are all actuated in response to the operation of the throttle grip, and throttle valve(s) corresponding to the remaining cylinders are all actuated by the valve actuator. Alternatively, the multi-cylinder engine may incorporate a throttle device including throttle valves corresponding to cylinders, respectively and being all actuated by the valve actuator. In a further alternative, the multi-cylinder engine may incorporate a throttle device which is provided with a bypass passage allowing for the air to flow by bypassing the throttle valve inside the air-intake passage and includes an electric bypass valve that opens and closes the bypass passage.

To increase the engine driving power only by increasing the fuel amount and advancing the ignition timing without increasing the amount of air-intake to the engine, the multi-cylinder engine may incorporate a throttle device including throttle valves all of which are actuated in response to the operation of the throttle grip.

The transmission may be an automated transmission or a continuously variable transmission (CVT). The driving power source in the vehicle is not limited to the engine but may be an electric motor/generator instead of or in addition to the engine. In a case where the deceleration control system of the present invention is incorporated into an electric vehicle including the electric motor/generator as the driving power source, the electric motor/generator is controlled to increase a torque transmitted to the drive wheel in order to increase a driving power during deceleration, or may be controlled to generate electric power with a small quantity by regenerative braking.

The deceleration control system of the present invention may be suitably applied to vehicles other than the motorcycle. For example, in a case where the deceleration control system is applied to a four-wheeled automobile, an accelerator pedal of the automobile may correspond to the throttle grip described in the above embodiment and a brake pedal may correspond to the brake lever and the brake pedal described in the above embodiment.

The deceleration control system of the present invention is capable of properly mitigating deceleration caused by occurrence of a back torque, according to a driving state of a vehicle, and is widely used as a deceleration control system built into vehicles such as the motorcycle. In particular, the present invention is suitably applied to a straddle-vehicle in which an engine braking force significantly affects a vehicle body.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A deceleration control system in a vehicle comprising:
a throttle valve which changes its opening degree to change an air-intake amount to change torque generated in an engine;
a driving state detector for detecting a driving state of the vehicle; and
a controller including a memory for storing a control rule including a normal state rule which defines a target opening degree of the throttle valve corresponding to an operation position of an acceleration operation member operated by a driver and a deceleration state rule which defines the target opening degree of the throttle valve corresponding to at least one of an engine speed and a reduction gear ratio in a transmission,
wherein the controller is configured to:
derive the target opening degree based on the operation position of the acceleration operation member detected by the driving state detector with reference to the normal state rule;
detect whether or not deceleration of the vehicle has started, and detect a slip value of a drive wheel, based on the driving state detected by the driving state detector during a period in which the controller is referring to the normal state rule;
derive the target opening degree according to at least one of the engine speed and the reduction gear ratio detected by the driving state detector with reference to the deceleration state rule, when the controller detects that the deceleration of the vehicle has started, the target opening degree derived according to the deceleration state rule having a value which is greater than a value of a fully closed position; and
compensate the target opening degree derived with reference to the deceleration state rule to reduce the target opening degree, when the slip value of the drive wheel indicates that rotations of the drive wheel are greater than rotations of a driven wheel.

2. The deceleration control system in the vehicle according to claim 1,
wherein the controller is configured to determine whether or not a deceleration start condition that the driver has performed an operation for starting the deceleration is met, and to detect that the deceleration of the vehicle has started when the deceleration start condition is met,
wherein the deceleration start condition includes two or more conditions selected from the group comprising: a first condition that a braking device is actuated by a braking operation performed by the driver, a second condition that the reduction gear ratio in the transmission is changed to be a greater value, a third condition that an acceleration operation is not performed by the driver, and a fourth condition that a detected value of a rotational speed of the engine is a predetermined amount greater than an estimated value of the rotational speed which is estimated from the torque generated in the engine; and wherein the controller is configured to determine that the deceleration start condition is met when either one of the two or more conditions is met.

3. The deceleration control system in the vehicle according to claim 1, wherein the target opening degree derived with reference to the deceleration state rule (i) is constant when the engine speed is less than a first engine speed, (ii) increases along with the engine speed when the engine speed is greater than the first engine speed and less than a second engine speed, and (iii) is constant when the engine speed is greater than the second engine speed, wherein the first engine speed and the second engine speed are set according to the reduction gear ratio in the transmission, and as the reduction gear ratio is greater, the first engine speed is set to a less value and the second engine speed is set to a greater value, wherein the target opening degree derived with reference to the deceleration state rule is a constant value which is greater than the value of the fully closed position, when the engine speed is less than the first engine speed.

4. The deceleration control system in the vehicle according to claim 1, wherein the driving state detector includes a reduction gear ratio detector for detecting the reduction gear ratio in the transmission and a rotational speed detector for detecting the engine speed; and wherein the controller is configured to derive the target opening degree according to at least one of: the reduction gear ratio detected by the reduction gear ratio detector and the engine speed detected by the rotational speed detector, with reference to the deceleration state rule.

5. The deceleration control system in the vehicle according to claim 4, wherein the controller is configured to derive the target opening degree according to both of the reduction gear ratio and the engine speed with reference to the deceleration state rule.

6. The deceleration control system in the vehicle according to claim 4, wherein the target opening degree corresponding to a first reduction gear ratio in the transmission according to the deceleration state rule is greater than the target opening degree corresponding to a second reduction gear ratio in the transmission according to the deceleration state rule, the second reduction gear ratio being less than the first reduction gear ratio, and the target opening degree corresponding to a first engine speed according to the deceleration state rule is less than the target opening degree corresponding to a second engine speed according to the deceleration state rule, the second engine speed being greater than the first engine speed.

7. The deceleration control system in the vehicle according to claim 6, wherein the target opening degree is constant when the engine speed is less than the first engine speed;

the target opening degree increases along with the engine speed when the engine speed is equal to or greater than the first engine speed and less than the second engine speed; and the target opening degree is constant when the engine speed is equal to or greater than the second engine speed.

8. The deceleration control system in the vehicle according to claim 6, wherein the target opening degree is set to a greater value when the engine speed is less than the first engine speed and the reduction gear ratio is greater; and the target opening degree is set to a constant value irrespective of the reduction gear ratio when the engine speed is equal to or greater than the second engine speed.

9. The deceleration control system in the vehicle according to claim 6, wherein the first engine speed is set to a smaller value and the second engine speed is set to a greater value when the reduction gear ratio is greater.

10. The deceleration control system in the vehicle according to claim 1, wherein the controller is configured to compensate the target opening degree by multiplying the target opening degree derived with reference to the deceleration state rule by the compensation value according to the slip value, and wherein the compensation value is set to a value less than 1 when the slip value indicates that rotations of the drive wheel are greater than rotations of a driven wheel.

11. The deceleration control system in the vehicle according to claim 10, wherein the compensation value is set to a value greater than 1 when the slip value indicates that the rotations of the drive wheel are less than the rotations of the driven wheel.

12. A deceleration control system in a vehicle, comprising:

a slip value detector for detecting a slip value of a drive wheel; and a controller controlling a driving power generated in a driving power source and transmitted to the drive wheel;

wherein the controller is configured to:

control the driving power source such that the driving power is greater when a deceleration state of the vehicle is detected than when the deceleration state is not detected; and compensate the driving power to reduce the driving power when the deceleration state is detected, and the slip value of the drive wheel detected by the slip value detector indicates that rotations of the drive wheel are greater than rotations of a driven wheel.

13. The deceleration control system in the vehicle according to claim 12, wherein the controller is configured to control the driving power source by controlling an air intake amount, an fuel amount, or an ignition timing in an engine, such that the driving power is greater when the deceleration state of the vehicle is detected than when the deceleration state is not detected.

14. The deceleration control system in the vehicle according to claim 12, further comprising a driving state detector for detecting a driving state of the vehicle,
   wherein the controller is configured to
      control the driving power source such that the driving power when the deceleration state is detected is set according to the driving state detected by the driving state detector; and
      compensate the set driving power based on the slip value detected by the slip value detector.

15. The deceleration control system in the vehicle according to claim 14,
   wherein the driving state detector is configured to detect engine speed or a reduction gear ratio in a transmission, and
   wherein the controller is configured to compensate the driving power set according to the engine speed or the reduction gear ratio detected by the driving state detector, based on the slip value detected by the slip value detector.

* * * * *